US008606206B1

(12) United States Patent
Lam et al.

(10) Patent No.: US 8,606,206 B1
(45) **Date of Patent: *Dec. 10, 2013**

(54) TRAVELING WAVE BEAMFORMING NETWORK

(75) Inventors: Lawrence K. Lam, San Jose, CA (US); Joseph Ku, San Jose, CA (US)

(73) Assignee: Lockheed Martin Corporation, Bethesda, MD (US)

( * ) Notice: Subject to any disclaimer, the term of this patent is extended or adjusted under 35 U.S.C. 154(b) by 785 days.

This patent is subject to a terminal disclaimer.

(21) Appl. No.: 12/722,680

(22) Filed: Mar. 12, 2010

Related U.S. Application Data

(60) Provisional application No. 61/162,994, filed on Mar. 24, 2009, provisional application No. 61/161,382, filed on Mar. 18, 2009, provisional application No. 61/162,226, filed on Mar. 20, 2009.

(51) Int. Cl.
*H04B 1/06* (2006.01)

(52) U.S. Cl.
USPC .................... 455/273; 455/276.1; 340/572.1; 340/572.2; 343/778

(58) Field of Classification Search
USPC .................. 343/700 MS, 772, 776–778, 904
See application file for complete search history.

(56) References Cited

U.S. PATENT DOCUMENTS

| | | | | |
|---|---|---|---|---|
| 5,124,626 | A * | 6/1992 | Thoen | 318/610 |
| 6,016,304 | A * | 1/2000 | Kyle et al. | 370/206 |
| 6,107,910 | A * | 8/2000 | Nysen | 340/10.1 |
| 6,894,654 | B2 | 5/2005 | Lynch | |
| 7,271,767 | B2 | 9/2007 | Londre | |
| 7,526,263 | B2 * | 4/2009 | Niiranen et al. | 455/130 |
| 8,107,906 | B2 * | 1/2012 | Lum et al. | 455/137 |
| 8,208,885 | B1 * | 6/2012 | Lam | 455/273 |
| 2003/0156060 | A1 * | 8/2003 | Revankar et al. | 342/372 |
| 2008/0001750 | A1 * | 1/2008 | Kurup | 340/572.1 |
| 2009/0125746 | A1 * | 5/2009 | Rofougaran | 713/400 |
| 2010/0022193 | A1 * | 1/2010 | Melis et al. | 455/73 |

OTHER PUBLICATIONS

"Beamformer Architectures for Active Phase-Array Radar Antennas"; IEEE Transactions on Antennas and Propagation, vol. 47, No. 3, Mar. 1999; Ashook K. Agrawal, Eric L. Holzman.

* cited by examiner

*Primary Examiner* — Trinh Dinh
(74) *Attorney, Agent, or Firm* — Fraser Clemens Martin & Miller LLC; J. Douglas Miller

(57) ABSTRACT

A beamforming network includes a plurality of signal conditioning devices in signal communication with each other, wherein each of the signal conditioning devices receives an input signal, conditions the input signal by independently and selectively adjusting at least one of a time delay, a phase, and an amplitude of the input signal, and transmits an output signal to at least one of another of the signal conditioning devices, an antenna, and a load.

20 Claims, 3 Drawing Sheets

TRAVELING WAVE BEAMFORMING NETWORK

STATEMENT REGARDING GOVERNMENT SPONSORED RESEARCH OR DEVELOPMENT

Not Applicable.

CROSS-REFERENCE TO RELATED APPLICATION

The present application claims priority to the following: U.S. Provisional Application Ser. No. 61/161,382 filed Mar. 18, 2009; U.S. Provisional Application Ser. No. 61/162,226 filed Mar. 20, 2009; and U.S. Provisional Application Ser. No. 61/162,994 filed Mar. 24, 2009. Each of the foregoing Applications is incorporated by reference herein in its entirety.

FIELD OF THE INVENTION

The present invention is generally related to array beam formation and beam steering. In particular, the invention is directed to a beamforming network for a travelling wave.

BACKGROUND OF THE INVENTION

Providing precision control over the time delay, amplitude and phase delay of a radio frequency (RF) signal is fundamental to many applications that require precision and programmable RF signal conditioning. These applications include wideband array beam formation and diversity aperture combining.

In conventional true time delay devices, a control of time delays and phase is not independent from each other. Changing the time delay affects the phase delay of the carrier of the signal. The coupling of time delay and phase delay creates complexity at the system level, and is not desired for applications that require advanced signal conditioning techniques.

In conventional beamforming networks, time delays are located in a corporate feed structure. Prior art generally uses a two dimensional corporate tree feeding network, which can be physically larger than the present invention because of the two dimensional topology. The corporate feed structure is costly to implement, especially when feeding a large phase array with thousands of radiating elements.

Examples of the conventional beam forming networks include U.S. Pat. Nos. 6,894,654 and 7,271,767, hereby incorporated herein by reference in their entirety.

It would be desirable to develop a beamforming network that is streamlined over a conventional network and minimizes the required aggregate time delay, wherein the beamforming network minimizes overall package size and associated cost.

SUMMARY OF THE INVENTION

Concordant and consistent with the present invention, a beamforming network that is streamlined over a convention network and minimizes the required aggregate time delay, wherein the beamforming network minimizes overall package size and associated cost, has surprisingly been discovered.

The present invention provides a means to provide electronic beam scan for wideband RF signals.

In one embodiment, a beamforming network comprises a plurality of signal conditioning devices in signal communication with each other, wherein each of the signal conditioning devices receives an input signal, conditions the input signal by independently and selectively adjusting at least one of a time delay, a phase, and an amplitude of the input signal, and transmits an output signal to at least one of another of the signal conditioning devices, an antenna, and a load.

In another embodiment, a beamforming network comprises: a plurality of signal conditioning devices in signal communication with each other, wherein each of the signal conditioning devices receives an input signal, conditions the input signal by independently and selectively adjusting at least one of a time delay, a phase, and an amplitude of the input signal, and transmits an output signal, and wherein at least one of the signal conditioning devices includes an output power divider for dividing the output signal into a plurality of divided output signals; and an antenna in single communication with the at least one of the signal conditioning devices to receive one of the divided output signals, wherein another of the divided output signals is transmitted to at least one of a load and another of the signal condition devices.

In yet another embodiment, a plurality of signal conditioning devices in signal communication with each other, wherein each of the signal conditioning devices receives an input signal through an input, conditions the input signal by independently and selectively adjusting at least one of a time delay, a phase, and an amplitude of the input signal, and transmits an output signal, and wherein at least one of the signal conditioning devices includes a power combiner to receive a plurality of signals, combine the signals, and transmit a combined signal as the input signal through the input thereof; an antenna in single communication with the at least one of the signal conditioning devices, wherein the antenna receives a radio frequency signal and transmits the radio frequency signal to the power combiner, and wherein an output signal of another one of the signal conditioning devices is received by the power combiner of the at least one signal conditioning device and combined with the radio frequency signal.

BRIEF DESCRIPTION OF THE DRAWINGS

The above, as well as other advantages of the present invention, will become readily apparent to those skilled in the art from the following detailed description of the preferred embodiment when considered in the light of the accompanying drawings in which.

DETAILED DESCRIPTION OF EXEMPLARY EMBODIMENTS OF THE INVENTION

The following detailed description and appended drawings describe and illustrate various embodiments of the invention.

The description and drawings serve to enable one skilled in the art to make and use the invention, and are not intended to limit the scope of the invention in any manner. In respect of the methods disclosed, the steps presented are exemplary in nature, and thus, the order of the steps is not necessary or critical.

Figure 1:
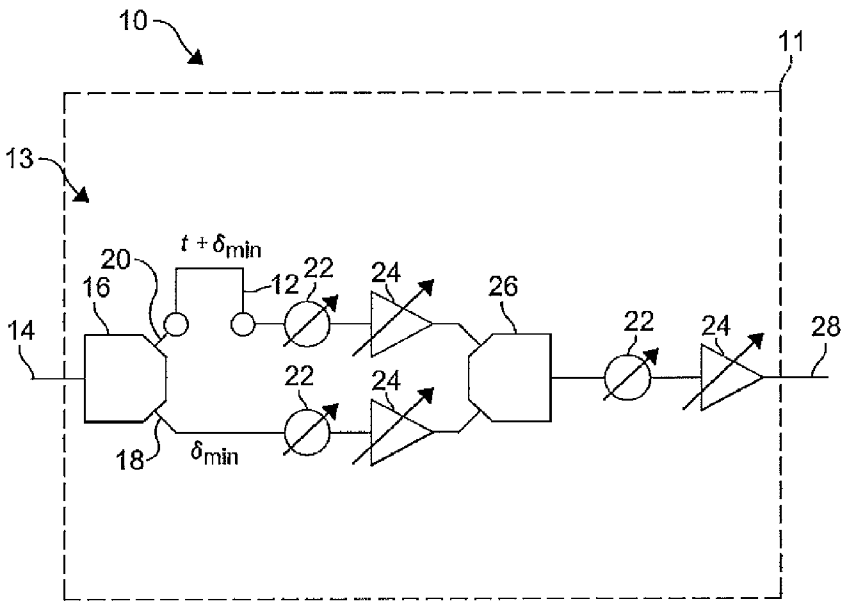
FIG. 1 is a schematic representation of a signal conditioning device according to an embodiment of the present invention.

FIG. 1 illustrates a signal conditioning device 10 (also referred to as a TAP device) for providing selective, independent, and variable control over a time delay, an amplitude, and a phase of a radio frequency signal, according to an embodiment of the present invention. As a non-limiting example, the TAP device 10 is implemented as a packaged radio frequency integrated circuit (RFIC) having a die (not shown) mounted to a substrate 11 and enclosed in a package (not shown). As a further non-limiting example, the TAP device 10 is a device similar to the signal conditioning device disclosed in the commonly owned U.S. patent application Ser. No. 12/722,625 entitled "Variable Time, Phase, And Amplitude Control Device", filed on Mar. 12, 2010, incorporated herein by reference in its entirety.

In the embodiment shown, the substrate 11 is a multi-layer circuit board including a plurality of striplines 12 or conductive transmission lines integrated therewith to provide pre-determined time delays. As a non-limiting example, the striplines 12 are embedded within the substrate 11. It is understood that any number of the striplines 12 can be used. It is further understood that any substrate and packaging technique can be used. For example, the TAP device 10 may be packaged using a liquid crystal polymer package, a quad flat no lead (QFN) package, or any other surface mount technology, now known or later developed.

The TAP device 10 includes a signal conditioning circuit 13 typically disposed on a die or embedded therein. However, other configurations can be used. The signal conditioning circuit 13 includes an input 14 to receive a signal (e.g. radio frequency signal) and direct the signal to a two-way power divider 16. As a non-limiting example, the power divider 16 is an in-phase power divider such as a MIA-COM DS-327. However, another power dividers can be used such as a Wilkinson power divider, for example. The outputs of the power divider 16 are coupled to a first time delay path 18 and a second time delay path 20, respectively. It is understood that a length of each of the time delay paths 18, 20 is selectively varied by coupling the delay paths 18, to one of the striplines 12 embedded in the substrate 11 or package, thereby independently varying a time delay associated with a signal transmitted therethrough. It is further understood that any of the delay paths 18, 20 can have a static time delay.

A plurality of control devices, namely a phase shifter 22 and a variable gain amplifier 24, are disposed along each of the delay paths 18, 20 to provide selective, variable, and independent control over a phase and amplitude of the signals transmitted therethrough. As a non-limiting example, the phase shifters 22 and the variable gain amplifiers 24 are controlled in accordance with the methods disclosed in commonly owned U.S. Pat. No. 7,009,560, hereby incorporated herein by reference in its entirety. The signals transmitted through the delay paths 18, 22 are directed to a two-way power combiner 26. Another of the phase shifter 22 and the variable gain amplifier 24 are in signal communication with an output of the power combiner 26 to provide phase and amplitude control over a signal transmitted to the output 28 of the TAP device 10. In certain embodiments, the control devices 22, 24 disposed at the output 28 are different than the phase shifter 22 and the amplifier 24 disposed along the time delay paths 18, 20. It is understood that any number of control devices 22, 24 can be used to adjust a phase and amplitude of a signal transmitted through the TAP device 10. It is further understood that any type of control device can be used to provide control over at least one of the phase and amplitude of a signal transmitted through the TAP device 10 such as a variable attenuator and an I and Q vector modification circuit, for example.

As shown, the signal conditioning circuit 13 includes a first time delay configuration. Specifically, the first time delay path 18 has a length to produce a time delay of δmin and the second time delay path 20 has a length to produce a time delay of t+δmin. However, it is understood that the time delay paths 18, 20 can have any length and associated time delay. It is further understood that any number of time delay paths 18, 20 may be used.

Figure 2:
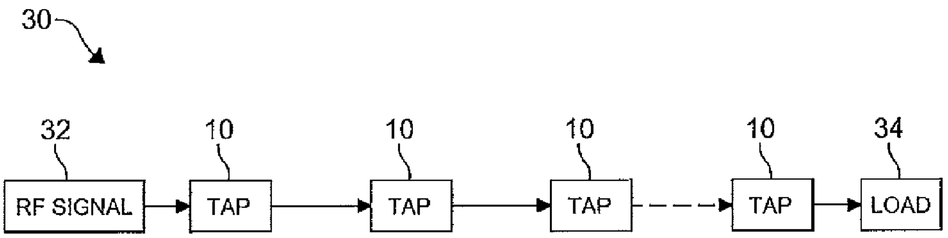
FIG. 2 is a schematic representation of a beamforming network according to an embodiment of the present invention.

FIG. 2 illustrates a beamforming network 30 including a plurality of the TAP devices 10 connected in series and interposed between an incoming signal 32 (e.g. radio frequency) and a load 34. It is understood that incoming signal 32 can be received from any signal source such as an antenna and a separate signal processing device or system, for example. It is further understood that the load 34 can be any device or system for receiving the output signal from the beamforming network 30.

In use, the incoming signal 32 is routed through each of the TAP devices 10 to provide to provide selective, variable, and independent control over a phase, time delay, and amplitude thereof. Each of the TAP devices 10 provides a selective and independent control over the conditioning of the incoming signal 32 at various points during transmission.

Specifically, the incoming signal 32 is received at the input 14 of each of the TAP devices 10. The power divider 16 receives the incoming signal 32 from the input 14 and generates a plurality of divided signals. Each of the divided signals is routed through at least one of the time delay paths 18, for signal conditioning. A time delay of each of the divided signals is determined by a length of an associate one of the time delay paths 18, 20. It is understood that any of the divided signals can be routed through any of the striplines 12 disposed in the substrate 11. The phase shifter 22 and amplifier 24 selectively and independently control a phase and amplitude of the divided signal transmitted through an associated one of the time delay paths 18, 20. As a non-limiting example, a control logic (not shown) controls the functionality of at least one of the phase shifter 22 and the amplifier 24. The divided signals are combined by the power combiner 26 to form an output signal that is transmitted through the output 28. A phase and an amplitude of the output signal can be adjusted by the phase shifter 22 and the amplifier 24 disposed between the output 28 and the power combiner 26.

Figure 3:
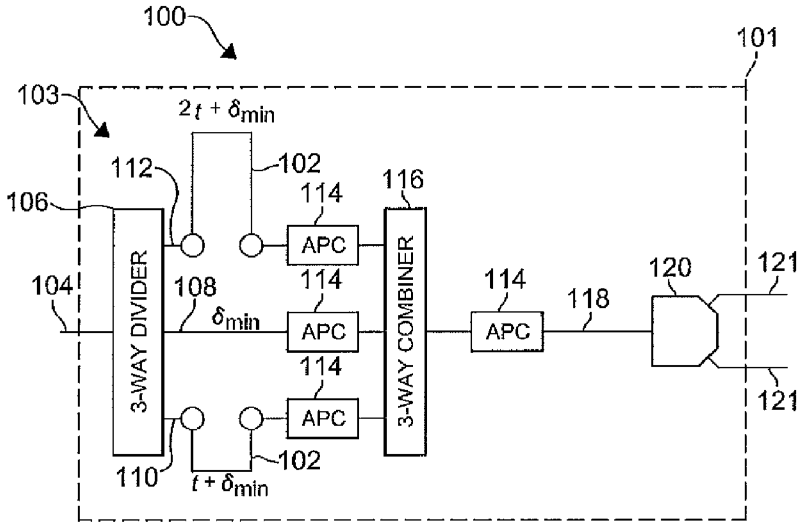
FIG. 3 is a schematic representation of a signal conditioning device according to another embodiment of the present invention.

FIG. 3 illustrates a tap device 100 according to another embodiment of the present invention similar to the tap device 10 except as described herein below. As a non-limiting example, the TAP device 100 is implemented as a packaged radio frequency integrated circuit (RFIC) having a die (not shown) mounted to a substrate 101 and enclosed in a package (not shown). In the embodiment shown, the substrate 101 is a multi-layer circuit board including a plurality of striplines 102 or conductive transmission lines integrated therewith to provide pre-determined time delays.

A signal condition circuit 103 of the tap device 100 includes an input 104 to receive a signal (e.g. radio frequency signal) and direct the signal to a three-way power divider 106. The outputs of the power divider 106 are coupled to a first time delay path 108, a second time delay path 110, and a third time delay path 112, respectively. It is understood that a length of each of the time delay paths 108, 110, 112 is selectively varied by coupling the delay paths 108, 110, 112 to one of the striplines 102, thereby independently varying a time delay associated with a signal transmitted therethrough. It is further understood that any of the delay paths 108, 110, 112 can have a static time delay. An amplitude/phase control device (APC) 114 is disposed along each of the delay paths 108, 110, 112 to provide selective, variable, and independent control over at least one of a phase and an amplitude of the signals transmitted therethrough. As a non-limiting example, the APC's 114 are similar to the control device described in U.S. Pat. No. 6,016,304, hereby incorporated herein by reference in its entirety. However, it is understood that other devices for controlling at least one of a phase and an amplitude of a signal can be used such as phase shifters, variable gain amplifiers, and I and Q signal processing devices or systems. The signals transmitted through the delay paths 108, 110, 112 are directed to a three-way power combiner 116. Another APC 114 is in signal communication with an output of the power combiner 116 to provide phase and amplitude control over a signal transmitted to an output 118. It is understood that any number of control devices 114 can be used to adjust a phase and amplitude of a signal transmitted through the TAP device 100. It is further understood that any control device can be used to provide control over at least one of the phase and amplitude of a signal transmitted through the TAP device 100 such as a variable attenuator and an I and Q vector modification circuit, for example. As shown, a signal condition circuit 103 includes a two-way power divider 120 coupled to an output 118 to divide the output signal into a plurality of divided output signals 121.

In the embodiment shown, the first time delay path 108 has a length to produce a time delay of δmin, the second time delay path 110 has a length to produce a time delay of t+δmin, and the third time delay path 112 has a length to produce a time delay of 2t+δmin. It is understood that the paths 108, 110, 112 can have any length to provide any time delay.

Figure 4:
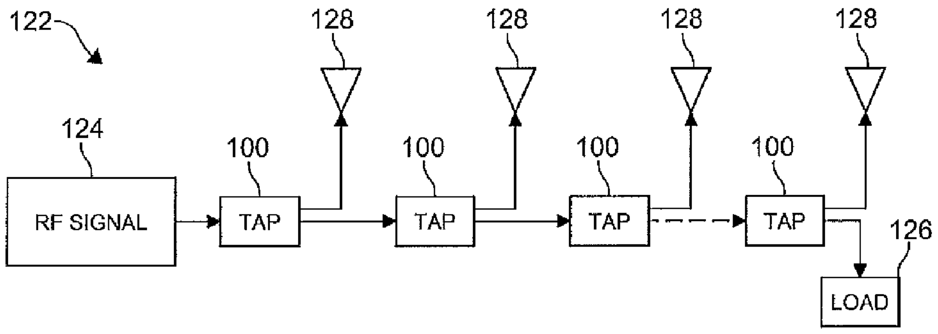
FIG. 4 is a schematic representation of a beamforming network according to another embodiment of the present invention.

FIG. 4 illustrates a beamforming network 122 including a plurality of the TAP devices 100 connected in series and interposed between an incoming signal 124 (e.g. radio frequency) and a load 126. As shown, each of the TAP devices 100 is in signal communication with at least one antenna 128.

In use, each of the TAP devices 100 provides a selective and independent control over the conditioning of the incoming signal 124 at various points during transmission. Specifically, the incoming signal 124 is received at the input 104 of each of the TAP devices 100. The power divider 116 receives the incoming signal 124 from the input 104 and generates a plurality of divided signals. Each of the divided signals is routed through at least one of the time delay paths 108, 110, 112 for signal conditioning. A time delay of each of the divided signals is determined by a length of an associated one of the time delay paths 108, 110, 112. It is understood that any of the divided signals can be routed through any of the striplines 102 disposed in the substrate 101. The APC's 114 selectively and independently control a phase and amplitude of the divided signal transmitted through an associated one of the time delay paths 108, 110, 112. As a non-limiting example a control logic (not shown) controls the functionality of at least one of the APC's 114. The divided signals are combined by the power combiner 116 to form an output signal that is transmitted through the output 118. A phase and an amplitude of the output signal can be adjusted by the APC 114 disposed between the output 118 and the power combiner 116. The output signal is transmitted to the two-way power divider 120 to generate the divided output signals 121. As a non-limiting example, one of the divided output signals 121 of each of the TAP devices 100 is transmitted to at least one of the antenna 128, while another of the divided output signals 121 of each of the TAP devices 110 is transmitted to at least one of the load 126 and another one of the TAP devices 100. It is understood that the time delay, the phase, and the amplitude, of each of the divided output signals 121 transmitted by each of the TAP devices 100 can be configured to provide a systolic transmission line for wideband beam steering through the antenna 128.

Figure 5:
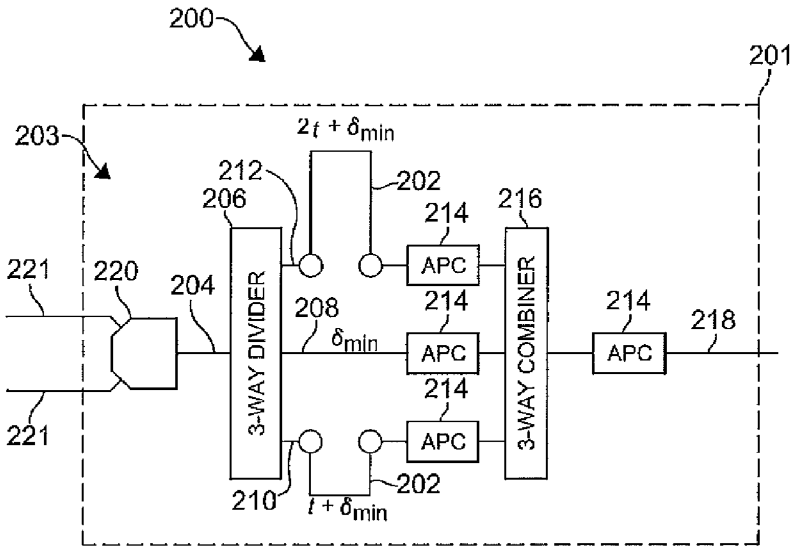
FIG. 5 is a schematic representation of a signal conditioning device according to another embodiment of the present invention.

FIG. 5 illustrates a tap device 200 according to another embodiment of the present invention similar to the tap device 100 except as described herein below. As a non-limiting example, the TAP device 200 is implemented as a packaged radio frequency integrated circuit (RFIC) having a die (not shown) mounted to a substrate 201 and enclosed in a package (not shown). In the embodiment shown, the substrate 201 is a multi-layer circuit board including a plurality of striplines 202 or conductive transmission lines integrated therewith to provide pre-determined time delays.

A signal condition circuit 203 of the tap device 200 includes an input 204 to receive a signal (e.g. radio frequency signal) and direct the signal to a three-way power divider 206. The outputs of the power divider 206 are coupled to a first time delay path 208, a second time delay path 210, and a third time delay path 212, respectively. It is understood that a length of each of the time delay paths 208, 210, 212 is selectively varied by coupling the delay paths 208, 210, 212 to one the striplines 202, thereby independently varying a time delay associated with a signal transmitted therethrough. An amplitude/phase control device (APC) 214 is disposed along each of the delay paths 208, 210, 212 to provide selective, variable, and independent control over at least one of a phase and an amplitude of the signals transmitted therethrough. As a non-limiting example, the APC's 214 may be similar to the control device described in U.S. Pat. No. 6,016,304. However, it is understood that other devices for controlling at least one of a phase and an amplitude of a signal can be used such as phase shifters, variable gain amplifiers, and I and Q signal processing devices or systems. The signals transmitted through the delay paths 208, 210, 212 are directed to a three-way power combiner 216. Another APC 214 is in signal communication with an output of the power combiner 216 to provide phase and amplitude control over a signal transmitted to an output 218. It is understood that any number of control devices 214 can be used to adjust a phase and amplitude of a signal transmitted through the TAP device 200. It is further understood that any control device can be used to provide control over at least one of the phase and amplitude of a signal transmitted through the TAP device 200 such as an I and Q vector modification circuit, for example. A power combiner 220 is coupled to the input 204 to combine a plurality of received signals into a single input signal to be transmitted through the input 204 for conditioning. As a non-limiting example the power combiner 220 is a two-way power combiner having a pair of divided inputs 221, each of the divided inputs 221 capable of receiving a signal (e.g. RF signal).

In the embodiment shown, the first time delay path 208 has a length to produce a time delay of δmin, the second time delay path 210 has a length to produce a time delay of t+δmin, and the third time delay path 212 has a length to produce a time delay of 2t+δmin. It is understood that the paths 208, 210, 212 can have any length to provide any time delay.

Figure 6:
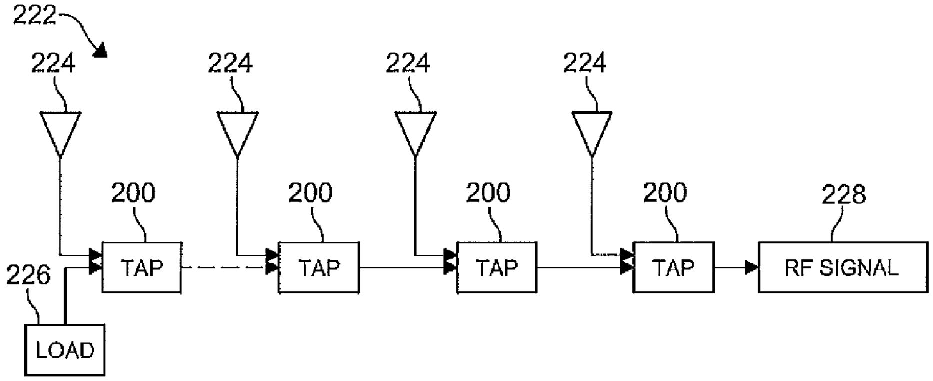
FIG. 6 is a schematic representation of a beamforming network according to another embodiment of the present invention.

FIG. 6 illustrates a beamforming network 222 including a plurality of the TAP devices 200 connected in series. Each of the TAP devices 200 is in signal communication with at least one of an antenna 224 and a load 226 to receive a plurality of signals, condition the signals, and transmit a conditioned RF signal 228 therefrom.

In use, each of the TAP devices 200 receives a signal from at least one of the antenna 224, the load 226, and another one of the TAP devices 200. Each of the TAP devices 200 provides a selective and independent control over the conditioning of the incoming signal at various points or sections of the beamforming network 222.

Specifically, an input signal is received at the input 204 of each of the TAP devices 200. It is understood that where more than one input signal is received, the power combiner 220 of each of the TAP devices 200 combines each of the received signals and generates a single input signal. The power divider 206 receives the single input signal from the input 204 and generates a plurality of divided signals. Each of the divided signals is routed through at least one of the time delay paths 208, 210, 212 for signal conditioning. A time delay of each of the divided signals is determined by a length of an associate one of the time delay paths 208, 210, 212. It is understood that any of the divided signals can be routed through any of the striplines 202 disposed in the substrate 201. The APC's 214 selectively and independently control a phase and amplitude of the divided signal transmitted through an associated one of the time delay paths 208, 210, 212. As a non-limiting example, a control logic (not shown) controls the functionality of at least one of the APC's 214. The divided signals are combined by the power combiner 216 to form an output signal that is transmitted through the output 218. A phase and an amplitude of the output signal can be adjusted by the APC 214 disposed between the output 218 and the power combiner 216. In certain embodiments, the output signal is transmitted to another one of the TAP devices 200 to be combined with another signal received thereby. It is understood that the time delay, the phase, and the amplitude, of each of the input signals received by each of the TAP devices 200 can be configured to provide a systolic transmission line for wideband beam steering of a plurality of RF signals received by the antenna 224.

The beamforming network 30, 122, 222 is streamlined over the conventional networks and minimizes the required aggregate time delay. The beamforming network 30, 122, 222 minimizes an overall package size and associated cost of manufacturing. The beamforming network 30, 122, 222 provides a simple and compact signal distribution and reception network.

From the foregoing description, one ordinarily skilled in the art can easily ascertain the essential characteristics of this invention and, without departing from the spirit and scope thereof, make various changes and modifications to the invention to adapt it to various usages and conditions.

What is claimed is:

1. A beamforming network comprising a plurality of signal conditioning devices in signal communication with each other, wherein each of the signal conditioning devices receives an input signal, conditions the input signal by independently and selectively adjusting at least one of a time delay, a phase, and an amplitude of the input signal, and transmits an output signal to at least one of another of the signal conditioning devices, an antenna, and a load.

2. The beamforming network according to claim 1, wherein at least one of the signal conditioning devices includes:

a power divider for receiving the input signal and dividing the input signal into a plurality of divided signals;

a plurality of time delay paths, each of the time delay paths coupled to an output of the power divider to receive at least one of the divided signals; and a power combiner for receiving the divided signals from the time delay paths and combining the signals into the output signal.

3. The device according to claim 2, wherein at least one of the time delay paths has a different length and associated time delay than another one of the time delay paths.

4. The beamforming network according to claim 2, wherein at least one of the signal conditioning devices includes a substrate having at least one transmission line integrated therewith, wherein at least one of the time delay paths is in signal communication with the at least one transmission line to define a time delay associated therewith.

5. The beamforming network according to claim 1, wherein at least one of the signal conditioning devices includes:

a power divider for receiving the input signal and dividing the input signal into a plurality of divided signals;

a plurality of time delay paths, each of the time delay paths coupled to an output of the power divider to receive at least one of the divided signals;

a control device in signal communication with at least one of the time delay paths for controlling at least one of a phase shift and an amplitude of at least one of the divided signals transmitted therethrough; and a power combiner for receiving the at least one of the divided signals from each of the time delay paths and combining the signals into the output signal.

6. The device according to claim 5, wherein the control device includes a phase shifter.

7. The device according to claim 5, wherein the control device includes a variable gain amplifier.

8. The device according to claim 5, wherein the control device is an amplitude/phase control device.

9. The beamforming network according to claim 1, wherein at least one of the signal conditioning devices receives the input signal from at least one of an antenna, a load, and another one of the signal condition devices.

10. A beamforming network comprising:

a plurality of signal conditioning devices in signal communication with each other, wherein each of the signal conditioning devices receives an input signal, conditions the input signal by independently and selectively adjusting at least one of a time delay, a phase, and an amplitude of the input signal, and transmits an output signal, and wherein at least one of the signal conditioning devices includes an output power divider for dividing the output signal into a plurality of divided output signals; and an antenna in single communication with the at least one of the signal conditioning devices to receive one of the divided output signals, wherein another of the divided output signals is transmitted to at least one of a load and another of the signal condition devices.

11. The beamforming network according to claim 10, wherein at least one of the signal conditioning devices includes:

an input power divider for receiving the input signal and dividing the input signal into a plurality of divided signals;

a plurality of time delay paths, each of the time delay paths coupled to an output of the power divider to receive at least one of the divided signals; and a power combiner for receiving the divided signals from the time delay paths and combining the signals into the output signal.

12. The device according to claim 11, wherein at least one of the time delay paths has a different length and associated time delay than another one of the time delay paths.

13. The beamforming network according to claim 11, wherein at least one of the signal condition devices includes a substrate having at least one transmission line integrated therewith, wherein at least one of the time delay paths is in signal communication with the at least one transmission line to define a time delay associated therewith.

14. The beamforming network according to claim 10, wherein at least one of the signal condition devices includes:

an input power divider for receiving the input signal and dividing the input signal into a plurality of divided signals;

a plurality of time delay paths, each of the time delay paths coupled to an output of the power divider to receive at least one of the divided signals;

a control device in signal communication with at least one of the time delay paths for controlling at least one of a phase shift and an amplitude of at least one of the divided signals; and a power combiner for receiving the divided signals from the time delay paths and combining the signals into the output signal.

15. The beamforming network according to claim 14, wherein at least one of the signal conditioning devices receives the input signal from at least one of an antenna, a load, and another one of the signal condition devices.

16. A beamforming network comprising:

a plurality of signal conditioning devices in signal communication with each other, wherein each of the signal conditioning devices receives an input signal through an input, conditions the input signal by independently and selectively adjusting at least one of a time delay, a phase, and an amplitude of the input signal, and transmits an output signal, and wherein at least one of the signal conditioning devices includes a power combiner to receive a plurality of signals, combine the signals, and transmit a combined signal as the input signal through the input thereof; and an antenna in single communication with the at least one of the signal conditioning devices, wherein the antenna receives a radio frequency signal and transmits the radio frequency signal to the power combiner, and wherein an output signal of another one of the signal conditioning devices is received by the power combiner of the at least one signal conditioning device and combined with the radio frequency signal.

17. The beamforming network according to claim 16, wherein at least one of the signal conditioning devices includes:

an input power divider for receiving the input signal and dividing the input signal into a plurality of divided signals;

a plurality of time delay paths, each of the time delay paths coupled to an output of the power divider to receive at least one of the divided signals; and a power combiner for receiving the divided signals from the time delay paths and combining the signals into the output signal.

18. The beamforming network according to claim 17, wherein at least one of the signal conditioning devices includes a substrate having at least one transmission line integrated therewith, wherein at least one of the time delay paths is in signal communication with the at least one transmission line to define a time delay associated therewith.

19. The beamforming network according to claim 16, wherein at least one of the signal conditioning devices includes:

an input power divider for receiving an input signal and dividing the input signal into a plurality of divided signals;

a plurality of time delay paths, each of the time delay paths coupled to an output of the power divider to receive at least one of the divided signals;

a control device in signal communication with at least one of the time delay paths for controlling at least one of a phase shift and an amplitude of at least one of the divided signals; and a power combiner for receiving the divided signals from the time delay paths and combining the signals into the output signal.

20. The beamforming network according to claim 19, wherein at least one of the signal conditioning devices includes a substrate having at least one transmission line integrated therewith, wherein at least one of the time delay paths is in signal communication with the at least one transmission line to define a time delay associated therewith.

* * * * *